June 6, 1967   N. W. F. PHILLIPS   3,323,909
REMOVAL OF SOLID DEPOSITS FROM CONDUITS
Filed July 22, 1966

INVENTOR.
NORMAN WILLIAM FREDERICK PHILLIPS
BY Michael Dofney
ATTORNEY

3,323,909
REMOVAL OF SOLID DEPOSITS FROM CONDUITS
Norman William Frederick Phillips, Arvida, Quebec, Canada, assignor to Aluminium Laboratories Limited, Montreal, Quebec, Canada, a corporation of Canada
Filed July 22, 1966, Ser. No. 567,105
3 Claims. (Cl. 75—68)

This application is a continuation-in-part of my co-pending application Ser. No. 336,459, filed Jan. 8, 1964, and now abandoned.

This invention relates to the subhalide process of refining impure aluminum and recovering aluminum from aluminum alloys. More particularly the invention relates to the removal of solid deposits from the gas passages (conduits) of apparatus used for the subhalide process.

In the subhalide process for aluminum production, as exemplified by aluminum monochloride, aluminum trichloride gas is reacted in a converter with impure aluminum or aluminum alloy to produce aluminum monochloride gas; $AlCl_3 + 2Al = 3AlCl$. The aluminum monochloride gas stream, including a considerable amount of unreacted $AlCl_3$, is transferred by way of a conduit to a decomposer where the AlCl is converted to elemental aluminum and aluminum trichloride; $3AlCl = 2Al + AlCl_3$. The aluminum trichloride gas stream, including some undecomposed aluminum monochloride, is recirculated to the converter by way of a heater.

Solid alumina particles have been observed in this monochloride gas stream. Small amounts of water come into the system during the charging of the aluminum to be refined; this water reacts at converter temperatures (1100°–1300° C.) to produce finely divided alumina ($Al_2O_3$) particles which become suspended in the gas stream.

Aluminum monochloride reacts with carbon at these temperatures to form aluminum carbide particles which become suspended in the gas stream.

Metal impurities in the aluminum charge react to give the corresponding halides which tend to decompose in the monochloride gas stream; to give deposits of impurity rich alloys.

These particles, solid and liquid, deposit on the walls of the gas passage (transfer line) from the converter to the decomposer. As these deposits build up—a small weight forms a large volume of deposit, the pressure drop in the passage increases; eventually the passage may be so completely obstructed by the deposit of particles that the unit must be shut down and the deposits removed. Because of the high temperature of operation and the construction of the apparatus, it is extremely difficult to clean out these deposits by ordinary techniques.

It has been observed that the aluminum monochloride present in all the gas conduits tends to decompose therein producing molten aluminum particles which deposit on the walls of the passages. The molten aluminum appears to act as a "glue" for solid particles. Also the deposited molten aluminum tends to take up other metal compounds and forms alloys on the passage walls.

The principal object of this invention is removal of deposits from halide gas passages in the subhalide process for aluminum production. Other objects will become apparent in the course of the description of the invention.

Briefly in the process of the invention the objectionable deposits ordinarily laid down on the wall of the conduit through which the hereinafter defined gas streams flow are prevented from building up thereon by washing the conduit wall with a molten salt mixture consisting essentially of aluminum trichloride or tribromide and alkali metal halide and/or alkaline earth halide; the salt mixture is directed essentially only at the wall being washed.

Figure 1:
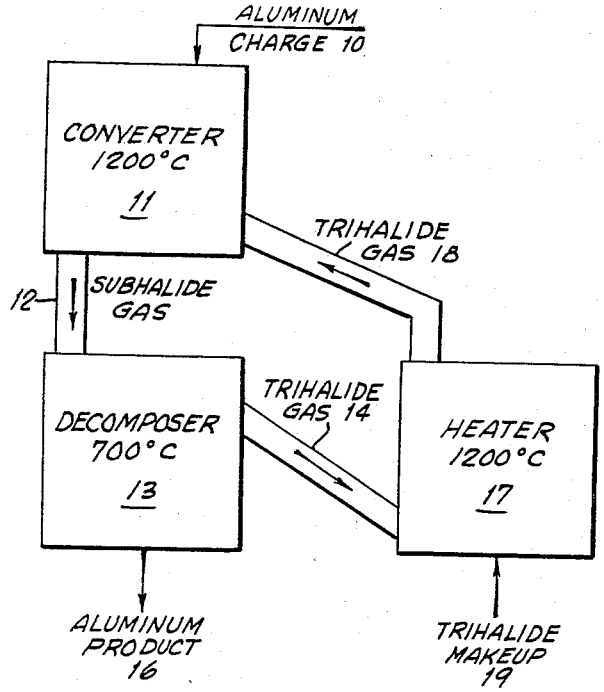
FIGURE 1 shows a box-diagrammatic view of apparatus for use in the subhalide process.

The general flow of the subhalide process is described sketchily in connection with FIGURE 1. The impure aluminum or alloy is charged by way of line 10 into converter 11 where it meets hot aluminum trichloride gas. It is to be understood that aluminum tribromide may also be used as the reacting gas. Suitable reaction temperatures are on the order of 1100°–1300° C. Gaseous aluminum monochloride, unreacted aluminum trichloride gas and suspended particles pass out of converter 11 into conduit (transfer line) 12. These particles tend to deposit on the walls of conduit 12, even though conduit 12 is made as short as equipment location and size permits. It is common to position converter 11 more or less above decomposer 13 so that line 12 is in a generally vertical downward position.

The subhalide gas stream in conduit 12 consists essentially of unreacted aluminum trichloride gas, aluminum monochloride gas, and dispersed non-gaseous materials such as alumina, aluminum carbide, and aluminum. Only a slight weight of these dispersed non-gaseous materials need be present to cause objectionable amounts of pressure drop through deposit buildup on the wall of the conduit.

The temperature of the gas stream is lowered in decomposer 13 to the point where substantially all the aluminum monochloride decomposes to molten elemental aluminum and aluminum trichloride gas. Suitable temperatures are about 650°–750° C. The gaseous aluminum trichloride stream which includes some aluminum monochloride gas is passed from decomposer 13 by way of conduit 14 into heater 17. There is some unavoidable decomposition of aluminum monochloride gas in conduit 14 and molten aluminum droplets tend to deposit on the walls of conduit 14; along with solids not completely removed during the stay in decomposer 13. Molten aluminum product is withdrawn by way of line 16.

Heater 17 brings the trihalide gas stream to converter temperature of about 1100°–1300° C. (Halide is to be understood as chloride or bromide.) The hot trihalide gas stream is passed by way of conduit 18 to converter 11. Conduit 18 tends to accumulate deposits of molten aluminum metal from decomposition of some of the aluminum monochloride content. In some cases passage 14 is at a temperature low enough to form deposits of solid aluminum metal particles.

Figure 2:
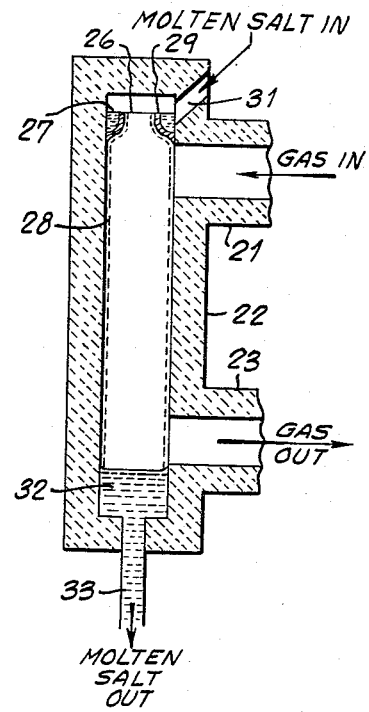
FIGURE 2 shows a simplified cross-sectional view of a passage in one embodiment of the invention.

FIGURE 2 illustrates one embodiment of the process improvement of this invention as applied to a vertical conduit 22. The subhalide gas stream is passed by conduit 21 into vertical conduit 22 and passes out by conduit 23. Approximately at the upper end of conduit 22 there is positioned an annular ring member 26. Member 26 is so shaped that a trough 27 is formed by the wall surface 28 and the member 26. The hereinafter defined molten salt is introduced by way of opening 31 which leads to trough 27. The molten salt overflows lip 29 of trough 27 and flows down the length of surface 28 removing any deposits thereon; by maintaining a substantially continuous flow of molten salt, particles are carried away as they settle to the flowing film of salt on wall 28 and are prevented from adhering to the surface of the wall. For engineering convenience the falling film of molten salt flows across the ends of conduit 21 and 23 in order to provide a film on wall 22. However any scrubbing effect on the gas streams is inconsequential.

A pool 32 of molten salt and (dispersed) suspended solid material is formed at the lower end of passage 22. Liquid from this pool is continuously withdrawn by way of line 33. The solid material content may be separated from the liquid salt by simple gravity setting or by a filter or by a liquid cyclone. The treated molten salt freed of solid material is then recycled by way of line 31 to the process.

Figure 3:
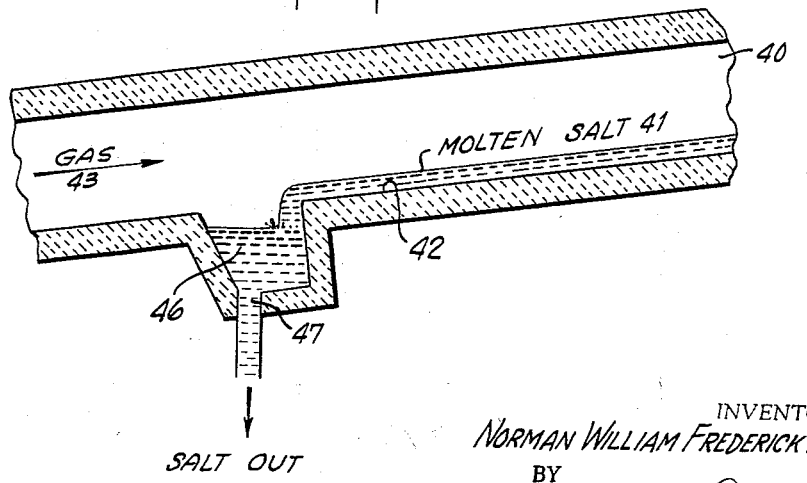
FIGURE 3 shows a simplified cross-sectional view of a passage in another embodiment of the invention.

FIGURE 3 shows another embodiment in which a stream of molten salt 41 flows along the lower portion of passage 40 countercurrent to gas stream 43. The stream 41 is shown to be collected in sump 46 and is withdrawn by way of opening 47.

Although early publications in this area speak of an appreciable solubility of aluminum in the hereinafter defined salt systems, it is now known that the solubility of aluminum is indeed insignificant and plays no part in this invention. The solid particles and molten aluminum particles are suspended in the molten salt mixture and are removed in this condition.

The washing operation may be substantially continuous during the operation of the subhalide process unit. However, some conduits form an objectionable amount of deposit more quickly than others; it may be desirable to wash continuously one or more such conduits and wash other conduits intermittently whenever pressure drop becomes objectionable. In some situations it may be possible to operate intermittently at all times. Furthermore, it may not be necessary to wash all the conduits because deposit may build up at such a slow rate that objectionable pressure drop does not occur during the normal operational period of the unit between regular shutdowns.

The wash liquid used in the process of this invention is a salt mixture which is inert to the materials present in the system. The composition of the salt mixture must be such that the mixture is liquid (molten) at the temperature conditions prevailing in the conduit being washed. Commonly the molten salt is a mixture (physical or chemical) of aluminum trichloride or tribromide and at least one alkali metal and/or alkaline earth chloride or bromide. The preferred mixtures are the loose chemical complexes commonly known as binary or ternary mixtures. Examples of suitable binary salt mixtures are: $AlCl_3$ and potassium chloride; $AlCl_3$ and calcium chloride; $AlCl_3$ and lithium chloride; aluminum bromide and barium bromide.

Aluminum trichloride and sodium chloride form a preferred binary mixture. In the case of binary aluminum trichloride-sodium chloride mixtures, the mixture may contain on the order of equimolar amounts of the two compounds—on a weight basis: $AlCl_3$, 69.5% and NaCl, 30.5%. The relative proportions may be varied on either side of the equimolar ratio; for example a suitable mixture for use at 700° C., and one atmosphere pressure consists of $AlCl_3$, 65% and NaCl, 35%.

It is to be understood that the above description is not exhaustive of the embodiments which may be devised of the process of the invention and many variations thereon may be readily devised by those of ordinary skill in this art.

Procedures for treating an aluminum halide gas flow by bringing the gas flow into extended surface contact with a molten salt are not claimed per se herein, but certain inventions involving such procedures are disclosed and claimed in the copending application of Norman W. F. Phillips and Frederick William Southam, Ser. No. 456,265 filed May 17, 1965, for Procedures for Treating Gaseous Aluminum Halide, said application Ser. No. 456,265 being owned by Aluminium Laboratories Ltd., the assignee of the present application.

Thus having described the invention what is claimed is:
1. In the process wherein aluminum trichloride or tribromide gas is reacted with impure aluminum or aluminum alloy at a temperature on the order of 1100°–1300° C. to produce a corresponding monohalide gas stream consisting essentially of corresponding aluminum monohalide gas, unreacted aluminum trihalide gas and dispersed non-gaseous materials selected from the class consisting of aluminum carbide, alumina and aluminum which materials tend to deposit on the walls of conduits through which said monohalide gas stream flows and to restrict flow of gas therethrough;
   said monohalide gas stream is cooled to a temperature where aluminum monohalide decomposes to form aluminum trihalide gas and molten aluminum;
   said molten aluminum is withdrawn as product;
   and aluminum trihalide gas is recycled to the reaction zone, said trihalide gas includes some monohalide gas which tends to deposit aluminum particles on the walls of conduits through which said trihalide gas flows:
   the improvement which consists of removing deposits from at least one of said conduits by washing with a molten salt complex mixture consisting of aluminum trihalide and at least one member selected from the class consisting of alkali metal halide and alkaline earth halide where said halide is selected from the group consisting of chloride and bromide, said salt mixture being directed essentially only at the wall being washed.
2. The process of claim 1 wherein said salt mixture consists of aluminum trichloride and sodium chloride and said trihalide gas is aluminum trichloride.
3. The process of claim 2 wherein said salt mixture consists of on the order of equimolar proportions of aluminum trichloride and sodium chloride.

References Cited
UNITED STATES PATENTS

| | | | |
|---|---|---|---|
| 2,621,120 | 12/1952 | Pedersin et al. | 75—68 |
| 2,715,606 | 8/1955 | Grote | 23—294 X |
| 2,914,398 | 11/1959 | Johnston et al. | 75—68 |
| 3,161,500 | 12/1964 | Southam | 75—68 |

FOREIGN PATENTS

| | | |
|---|---|---|
| 623,932 | 5/1949 | Great Britain. |
| 635,318 | 4/1950 | Great Britain. |

DAVID L. RECK, *Primary Examiner.*

H. W. TARRING, *Assistant Examiner.*